(12) United States Patent
Gao

(10) Patent No.: US 8,935,451 B2
(45) Date of Patent: Jan. 13, 2015

(54) NETWORK CARD DETECTING CIRCUIT

(75) Inventor: Zheng-Xin Gao, Shenzhen (CN)

(73) Assignee: ScienBiziP Consulting (Shenzhen) Co., Ltd., Guangdong (CN)

( * ) Notice: Subject to any disclaimer, the term of this patent is extended or adjusted under 35 U.S.C. 154(b) by 317 days.

(21) Appl. No.: 13/401,968

(22) Filed: Feb. 22, 2012

(65) Prior Publication Data

US 2013/0163437 A1     Jun. 27, 2013

(30) Foreign Application Priority Data

Dec. 22, 2011   (CN) .......................... 2011 1 0434288

(51) Int. Cl.
*G06F 13/00*     (2006.01)

(52) U.S. Cl.
USPC ............................ 710/300; 710/305; 710/316

(58) Field of Classification Search
USPC ......... 710/300–306, 316–317, 5–62; 713/300
See application file for complete search history.

(56) References Cited

U.S. PATENT DOCUMENTS

| | | | |
|---|---|---|---|
| 2002/0161938 A1* | 10/2002 | Bonomo et al. | 710/5 |
| 2008/0270853 A1 | 10/2008 | Chagoly et al. | |
| 2009/0248923 A1* | 10/2009 | Wang et al. | 710/62 |
| 2010/0037103 A1 | 2/2010 | Helmecke et al. | |

* cited by examiner

*Primary Examiner* — Faisal M Zaman
*Assistant Examiner* — Kim Huynh
(74) *Attorney, Agent, or Firm* — Novak Druce Connolly Bove + Quigg LLP

(57) ABSTRACT

A detecting circuit includes a network interface, a switch, a baseboard management controller (BMC) having first and second signal pins, and a detecting unit. The first and second signal pins receive low level signals when the network line is disconnected from the network interface. The first signal pin receives a high level signal and the second signal pin receives a low level signal when the network line is connected to the network interface but the network card is malfunctioning. The first and second signal pins receive high level signals when the network line is connected to the network interface and the network card works normally.

3 Claims, 1 Drawing Sheet

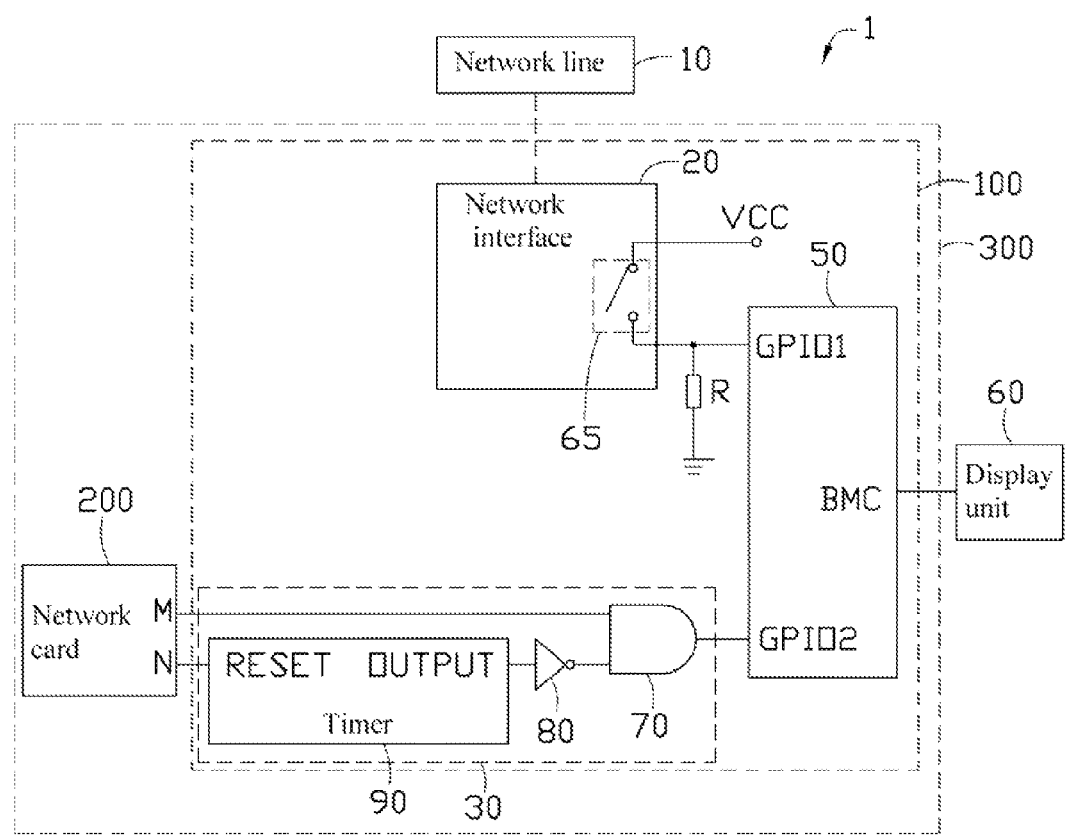

NETWORK CARD DETECTING CIRCUIT

BACKGROUND

1. Technical Field

The present disclosure relates to detecting circuits, and particularly to a detecting circuit for detecting a network card.

2. Description of Related Art

Many computers can receive data and transmit data to and from networks through the use of a network connection and a network card. If the connection is not made, or the network card is not installed properly, or the card is installed but not functioning properly then the computer cannot communicate with the network. The problem is that it is difficult for a user to know which of the three problems has occurred when they lose network communication. Therefore, there is room for improvement in the art.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments.

The FIGURE is a circuit diagram of a network card detecting circuit in accordance with an exemplary embodiment of the present disclosure.

DETAILED DESCRIPTION

The disclosure, including the drawing, is illustrated by way of example and not by way of limitation. References to "an" or "one" embodiment in this disclosure are not necessarily to the same embodiment, and such references mean at least one.

Referring to the FIGURE, a network card detecting circuit 100 is arranged on a motherboard 300 of a computer 1 to detect a network card 200 of the computer 1. The detecting circuit 100 in accordance with an exemplary embodiment includes a network interface 20, a switch 65 arranged inside the network interface 20, a resistor R, a baseboard management controller (BMC) 50, and a detecting unit 30.

A first end of the switch 65 is connected to a direct current (DC) power VCC. A second end of the switch 65 is grounded through the resistor R and also connected to a signal pin GPIO1 of the BMC 50. In one embodiment, the DC power VCC is a 5 volt (V) power source. The switch 65 may be a button. The switch 65 is closed when a network line 10 is connected to the network interface 20, thereby, the signal pin GPIO1 of the BMC 50 receives a high level signal from the DC power VCC through the switch 65. The switch 65 is opened when the network line 10 is disconnected from the network interface 20, thereby, the signal pin GPIO1 of the BMC 50 receives a low level signal from ground through the resistor R.

The detecting unit 30 includes a timer 90, a NOT gate 80, and an AND gate 70. A first input terminal of the AND gate 70 is connected to a signal pin M of the network card 200. A reset pin RESET of the timer 90 is connected to a signal pin N of the network card 200. An output pin OUTPUT of the timer 90 is connected to an input terminal of the NOT gate 80. An output terminal of the NOT gate 80 is connected to a second input terminal of the AND gate 70. An output terminal of the AND gate 70 is connected to a signal pin GPIO2 of the BMC 50.

A preset table is stored in the BMC 50 and includes signal states of the signal pins GPIO1 and GPIO2 of the BMC 50 and definition information corresponding to the signal states of the signal pins GPIO1 and GPIO2. If the signal pins GPIO1 and GPIO2 receive low level signals, it denotes that the network line 10 is disconnected from the network interface 20. If the signal pins GPIO1 receives a high level signal and the signal pin GPIO2 receives a low level signal, it denotes that the network line 10 is connected to the network interface 20 but the network card 200 is malfunctioning. If the signal pins GPIO1 and GPIO2 receive high level signals, it denotes that the network line 10 is connected to the network interface 20 and the network card 20 works normally.

In use, if the network line 10 is disconnected from the network interface 20, the switch 65 is opened and the signal pin GPIO1 of the BMC 50 receives a low level signal. The network card 200 will not work, thus, the signal pins M and N of the network card 200 output low level signals to the first input terminal of the AND gate 70 and the reset pin RESET of the timer 90. The output pin OUTPUT of the timer 90 outputs a high level signal to the input terminal of the NOT gate 80. The output terminal of the NOT gate 80 outputs a low level signal to the second input terminal of the AND gate 70. The output terminal of the AND gate 70 outputs a low level signal to the signal pin GPIO2 of the BMC 20. The BMC 50 compares the received low level signals from the signal pins GPIO1 and GPIO2 with the signal states stored in the preset table, and controls the display unit 60, such as a display screen of the computer 1, to display corresponding information, such as "the network line 10 is disconnected from the network interface 20".

If the network line 10 is connected to the network interface 20 but the network card 200 is malfunctioning, the switch 65 is closed and the signal pin GPIO1 of the BMC 50 receives a high level signal. The signal pin M of the network card 200 outputs a high level signal to the first input terminal of the AND gate 70. The signal pin N of the network card 200 outputs a low level signal to the reset pin RESET of the timer 90. The output pin OUTPUT of the timer 90 outputs a high level signal to the input terminal of the NOT gate 80. The output terminal of the NOT gate 80 outputs a low level signal to the second input terminal of the AND gate 70. The output terminal of the AND gate 70 outputs a low level signal to the signal pin GPIO2 of the BMC 50. The BMC 50 compares the received high level signal from the signal pin GPIO1 and the received low level signal from the signal pin GPIO2 with the signal states stored in the preset table, and controls the display unit 60 to display corresponding information, such as "the network line 10 is connected to the network interface 20 but the network card 200 is malfunctioning".

If the network line 10 is connected to the network interface 20 and the network card 200 works normally, the switch 65 is closed and the signal pin GPIO1 of the BMC 50 receives a high level signal. The signal pins M and N of the network card 200 output high level signals to the first input terminal of the AND gate 70 and the reset pin RESET of the timer 90. The output terminal of the timer 90 outputs a low level signal to the input terminal of the NOT gate 80. The output terminal of the NOT gate 80 outputs a high level signal to the second input terminal of the AND gate 70. The output terminal of the AND gate 70 outputs a high level signal to the signal pin GPIO2 of the BMC 50. The BMC 50 compares the received high level signals from the signal pins GPIO1 and GPIO2 with the signal states stored in the preset table, and controls the display unit 60 not to display any information.

The detecting circuit 100 can detect whether the network card 10 is connected to the network interface 20 through the signal pin GPIO1 and the switch 65, can detect whether the network card 200 works normally through the signal pin GPIO2 and the detecting unit 30, and can output detecting information to the display unit 60.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A network card detecting circuit applicable to a motherboard of a computer, the detecting circuit comprising:
   a resistor;
   a network interface;
   a switch arranged inside the network interface and comprising a first end connected to a direct current (DC) power and a second end grounded through the resistor;
   a detecting unit connected to first and second signal pins of a network card arranged on the motherboard, wherein the first and second signal pins of the network card output low level signals to the detecting unit when a network line is disconnected from the network interface; the first signal pin of the network card outputs a high level signal and the second signal pin of the network card outputs a low level signal to the detecting unit when the network line is connected to the network interface but the network card is malfunctioning; the first and second signal pins of the network card output high level signals to the detecting unit when the network line is connected to the network line and the network card works normally; and
   a baseboard management controller (BMC) comprising a first signal pin connected to the second end of the switch and a second signal pin connected to the detecting unit, wherein when the first and second signal pins of the BMC receive low level signals, the BMC controls a display unit to display "the network line is disconnected from the network interface"; when the first signal pin of the BMC receives a high level signal and the second signal pin of the BMC receives a low level signal, the BMC controls the display unit to display "the network line is connected to the network interface but the network card is malfunctioning"; when the first and second signal pins of the BMC receive high level signals, the BMC controls the display unit not to display any information.

2. The detecting circuit of claim 1, wherein the detecting unit comprises a timer, a NOT gate, and an AND gate, a first input terminal of the AND gate is connected to the first signal pin of the network card, a reset terminal of the timer is connected to the second signal pin of the network card, an output terminal of the timer is connected to an input terminal of the NOT gate, an output terminal of the NOT gate is connected to a second input terminal of the AND gate, an output terminal of the AND gate is connected to the second signal pin of the BMC.

3. The detecting circuit of claim 1, wherein the BMC comprises a preset table, the preset table stores signal states of the first and second signal pins of the BMC and definition information corresponding to the signal states.

* * * * *